United States Patent [19]

Inoue et al.

[11] Patent Number: 5,016,086
[45] Date of Patent: May 14, 1991

[54] IC CARD

[75] Inventors: Michiya Inoue; Yutaka Mizuno, both of Hachioji, Japan

[73] Assignee: Fanuc Ltd., Minamitsuru, Japan

[21] Appl. No.: 314,052

[22] PCT Filed: Aug. 4, 1988

[86] PCT No.: PCT/JP88/00776
§ 371 Date: Feb. 14, 1989
§ 102(e) Date: Feb. 14, 1989

[87] PCT Pub. No.: WO89/00924
PCT Pub. Date: Feb. 9, 1989

[30] Foreign Application Priority Data

Aug. 5, 1987 [JP] Japan ............................. 62-195754

[51] Int. Cl.$^5$ ............................................. H01L 23/02
[52] U.S. Cl. ........................................ 357/74; 235/492;
235/487; 235/443; 235/441; 174/52.4; 361/395;
361/397; 361/413; 361/400
[58] Field of Search ................... 357/74; 235/492, 487,
235/443, 441; 174/52.4; 361/395, 397, 413, 400

[56] References Cited

U.S. PATENT DOCUMENTS

| | | | |
|---|---|---|---|
| 4,521,679 | 6/1985 | Anderson | 235/492 |
| 4,727,246 | 2/1988 | Hara et al. | 174/52.4 |
| 4,780,603 | 10/1988 | Hamada | 235/492 |
| 4,780,791 | 10/1988 | Morita et al. | 235/492 |
| 4,791,608 | 12/1988 | Fushimoto | 174/52.4 |
| 4,794,243 | 12/1988 | Hamada | 235/492 |
| 4,797,542 | 1/1989 | Hara | 235/492 |
| 4,797,543 | 1/1989 | Watanabe | 235/492 |

FOREIGN PATENT DOCUMENTS 58-27257  2/1983  Japan .

*Primary Examiner*—Rolf Hille
*Assistant Examiner*—Steven Loke
*Attorney, Agent, or Firm*—Staas & Halsey

[57] ABSTRACT

An IC card having a connection portion, a changeover switch and card-shaped memory means in which an integrated circuit is accommodated within a prescribed case and has a processor and memory. Lead portions for connecting contact pins of said connecting portion and switch terminals of said switch to an internal circuit pattern, are packed in an insulating adhesive in order to provide a case with a hermetic structure.

2 Claims, 2 Drawing Sheets

IC CARD

TECHNICAL FIELD

This invention relates to an IC card incorporating an integrated circuit.

BACKGROUND ART

Cards in which a magnetic stripe serves as a memory medium are widely utilized as magnetic cards for cash cards and credit cards in on-line systems at banks and the like. Though these magnetic cards are low in cost, they have a small memory capacity and there is the danger that stored data may be erased by an external magnetic force. Accordingly, in recent years IC cards of larger memory capacity have been developed in which data will not be affected by external magnetism.

As used herein an IC card refers to card-shaped memory means having an internal processor and memory in the form of an integrated circuit of CMOS construction. When data is written or read from such an IC card, connector means are required for connection to associated equipment. Also required is a changeover switch used in order to set a write inhibit with respect to the IC card or to identify the type of IC card. A changeover switch of this kind switches or turns on/off a wiring circuit pattern on a printed board on which an integrated circuit chip is disposed within the IC card.

FIG. 5 is a perspective view showing the appearance of a conventional IC card and part of the structure of a switch portion exposed by cutting a portion of the card away.

As shown here, a changeover switch is mounted on a lead-out portion extending from the pattern on a printed board. A manipulating portion of this changeover switch protrudes from a side face of the card opposite a connector. The setting of a write inhibit or the identification of card type is performed by manipulating the manipulating portion.

Thus, in the conventional IC card, the connector portion is provided via the lead-out portion of the wire circuit pattern on the printed board and it is easy to provide the interior of the IC card with a hermetic structure by maintaining the lead-out portion air-tight. However, the changeover switch, which is incorporated as a part separate from the connector portion, has a movable portion for performing the changeover operation. In a case where a plurality of changeover switches are provided, it is not easy to process these switches individually and shield the interior of the IC card to protect it against the outside environment.

In addition, the lead-out portion of the wiring circuit pattern corresponding to the changeover switch is required to be plated with metal in order to provide good contact with the contacts. Since partial metal plating is carried out, labor is required and cost is high.

SUMMARY OF THE INVENTION

The present invention has been devised to solve the foregoing problems and its object is to provide an IC card, the interior of which can be shielded in a simple manner and which makes it possible to hold down an increase in cost even when a changeover switch is provided.

According to the present invention, an IC card is provided an having a connector portion and a changeover switch that are led out from a circuit pattern incorporating a semiconductor integrated circuit. The IC card comprises connector means formed integral with the connector portion and changeover switch, lead means for connecting connector pins of the connector means and contact terminals of the changeover switch with the circuit pattern, and a case for accommodating the circuit pattern, which includes the semiconductor integrated circuit, and forming a hermetic structure at the portion of the lead means.

Accordingly, the IC card of the present invention is such that by providing the connector portion with a switch, the lead portion from the wiring circuit pattern led out to the connector pins or switch terminals can readily be furnished with a hermetic structure. As a result, the interior of the case of the IC card is sufficiently protected from the outside environment and it is unnecessary to partially plate the wiring circuit pattern. This makes it possible to reduce cost.

BEST MODE FOR CARRYING OUT THE INVENTION

Embodiments of the present invention will now be described in detail with reference to the drawings.

Figure 1:
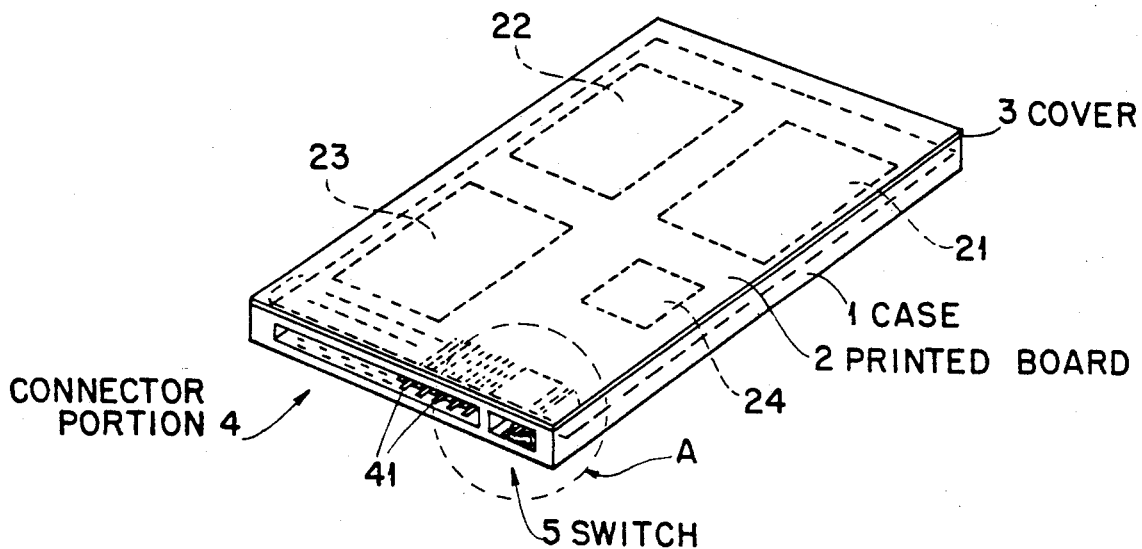
FIG. 1 is a perspective view illustrating an embodiment of the present invention.
Figure 2:
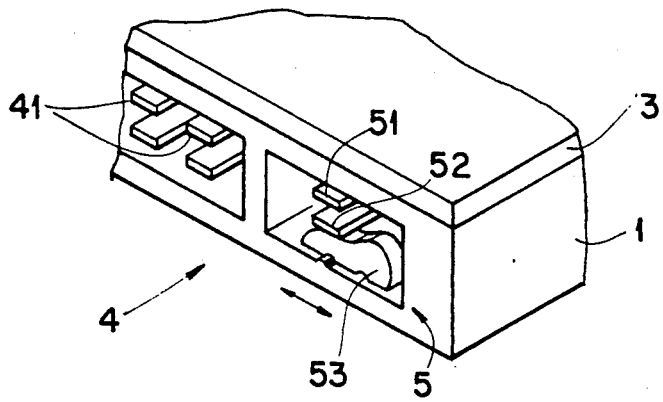
FIG. 2 is an enlarged perspective view of a portion of the embodiment.

FIG. 1 is a perspective view illustrating an embodiment of the present invention, and FIG. 2 is an enlarged view of a portion A in FIG. 1. In FIGS. 1 and 2, a printed board 2 is accommodated in the interior of a case 1. A cover 3 comprising a metal plate is affixed to the case 1 to protect the printed board 2. Mounted on the printed board 2 are semiconductor integrated circuits 21, 22, 23 such as a processor and memory, as well as a power supply 24 for backing up these integrated circuits. These components are connected by a predetermined wiring circuit pattern.

Numeral 4 denotes a connector portion provided on one end face of the case 1 and equipped with a plurality of connector pins 41 . . . 41 and a switch 5. The connector pins 41 . . . 41 are adapted to be connected to a plug for connection to associated equipment, not shown, so that data can be exchanged with this equipment. The switch 5 is positioned close to the connector portion 4. Terminals 51, 52 led out from the circuit pattern as in the manner of the connectors 41 . . . 41, make or break contact depending upon the operation of a slider 53 and are for setting states, such as for inhibiting the writing of data or cancelling the write inhibit. The structure of the switch 5 is such that when the slider 53, the top surface of which has a portion with a fixed incline, is moved to the left, the terminal 52 is urged upward into contact with the terminal 51 by the top surface of the slider 53, thereby turning the switch on. When the slider is moved to the right, the switch is turned off.

These connector pins 41 . . . 41 and terminals 51, 52 are connected to respective lead portions led out from a predetermined circuit portion of the wiring circuit pattern. A packing or cushioning material exhibiting excellent electrical insulation is packed between the case 1 and cover 3 inside the case at the plurality of terminal portions, thereby providing the interior of the IC card with a hermetic structure.

With this embodiment thus constructed, the interior of the IC card is provided with a hermetic structure by packing the plurality of lead portions, which connect the connector pins 41 or terminals 51, 52 to the circuit pattern, in an insulating packing or cushioning material by using an adhesive. As a result, the accommodated integrated circuits and circuit pattern are fully protected against the outside environment.

Figure 3:
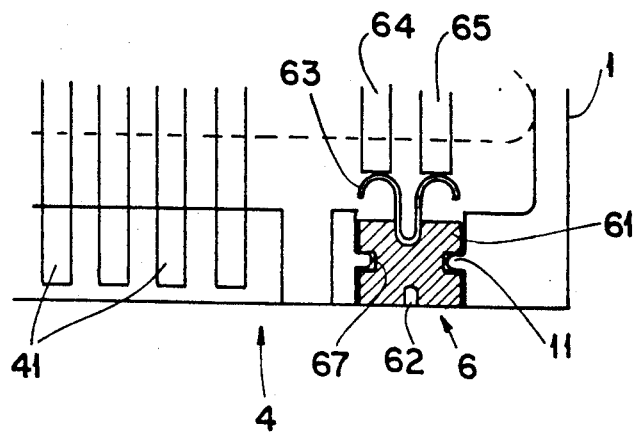
FIG. 3 is a partial top plane view of another of the present invention.
Figure 4:
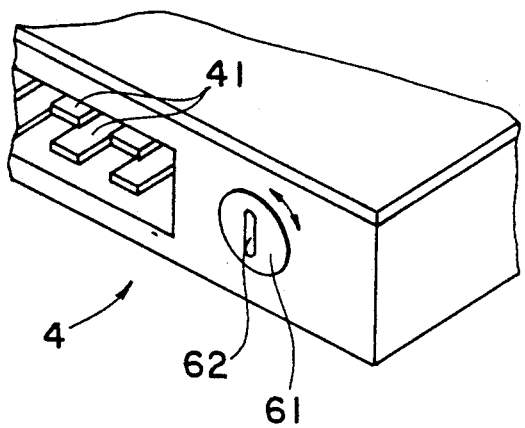
FIG. 4 is an enlarged perspective view of a portion of the embodiment of FIG. 3.
Figure 5:
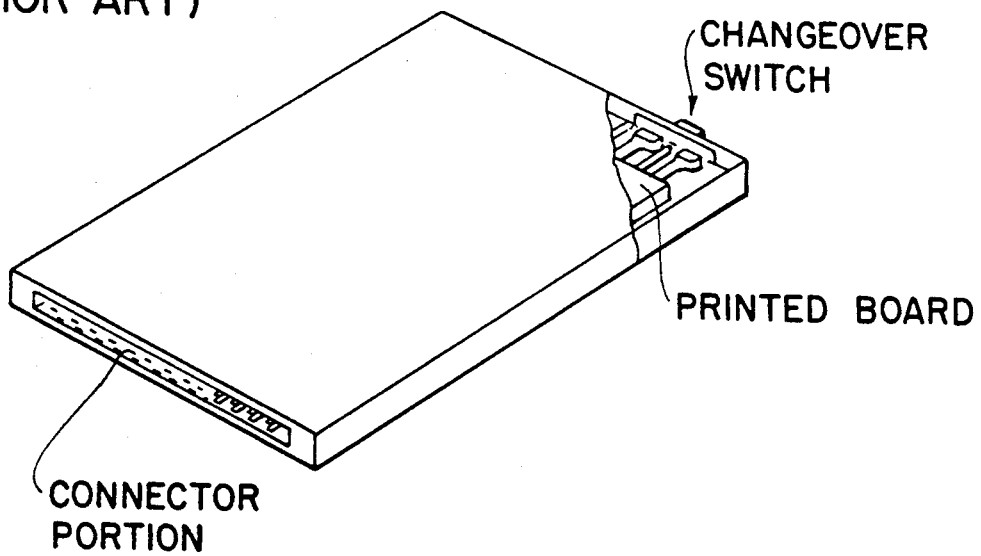
FIG. 5 is a perspective view showing an example of the prior art.

FIG. 3 is an explanatory view showing another embodiment of an IC card according to the invention and illustrates the switch and connector portions. FIG. 4 is a perspective view thereof. This IC card is an example of one using a rotary switch as a changeover switch. In FIGS. 3 and 4 the connector portion 4 is provided with the plurality of connector pins 41 ... 41 and a switch 6.

Numeral 61 denotes a rotor having a circular front end face provided with a manipulating portion 62 having one diametrically extending recess, and a back face to which a contact spring 63 is attached. The manipulating portion 62 is manipulated with the tip of screwdriver or the like, thereby enabling the rotor 61 to be turned. The resilient contact spring 63 also turns through the same angle of rotation as the rotor 61. At the rotational position of the rotor 61 shown in FIG. 3, terminals 64, 65, which are led out from the wiring circuit pattern and arranged side by side horizontally in the same manner as the connector pins 41, are brought into contact with respective ones of two distal end portions of the contact spring 63, thereby short-circuiting these terminals 64, 65. When the rotor 61 is rotated 90° from the position shown in FIG. 3, the connector spring 63 parts from the terminals 64, 65 so that the two terminals are disconnected from each other. Numeral 67 denotes a guide groove provided in the outer periphery of the rotor 61 for the purpose of mating with a projection 11 on the case 1. This expedient retains the rotor 61 in the case 1 against the elastic force of the spring contact 63.

With this embodiment thus constructed, the lead portions leading out to the contact pins 41 or contacts 64, 65 are packed in an insulating adhesive or another packing or cushioning matieral is used to form a hermetic structure inside of case, just as in the embodiment illustrated in FIGS. 1 and 2. The integrated circuits and circuit pattern within the IC card are reliably and readily protected.

Though an embodiment of the present invention has been described, the invention is not limited thereto but can be modified in a variety of ways without departing from the scope of the claims. For example, a push-button switch or see-saw switch can be used and incorporated in the connector portion.

The IC card of the invention is such that when the card is provided with connector means using a connector incorporating a switch and connected to associated equipment when writing or reading data, as well as a changeover switch used in order to set a write inhibit with respect to the IC card or to identify the type of IC card, the lead portions of connector pins and switch terminals led out from a circuit pattern within the IC card are provided with a hermetic structure.

We claim:

1. An IC card having a connector portion and a changeover switch that are led out from a circuit pattern incorporating a semiconductor integrated circuit, the IC card comprising:
   connector means formed integral with said connector portion and changeover switch;
   lead means for connecting connector pins of said connector means and contact terminals of said changeover switch with said circuit pattern;
   a case for accommodating said circuit pattern, which includes said semiconductor integrated circuit,
   said case having a cover, a back and four sides with three of said sides being comprised of solid wall portions and one of said sides having openings therein to accommodate said connector pins and said switch whereby said connector pins and said switch are both mounted in said one side; and
   an electrically insulating packing material provided inside said case around said lead means adjacent said openings in said one side to hermetically seal said case.

2. An IC card as set forth in claim 1, wherein said switch comprises a rotary switch having a circular rotatable body member with a resilient contact spring attached to an inner end thereof for contact with said contact terminals, said body member having a guide groove around its outer periphery for engaging a projection in said one side of said case.

* * * * *

UNITED STATES PATENT AND TRADEMARK OFFICE
CERTIFICATE OF CORRECTION

PATENT NO.  : 5,016,086
DATED       : May 14, 1991
INVENTOR(S) : MICHIYA INOUE and Yutaka Mizuno It is certified that error appears in the above-identified patent and that said Letters Patent is hereby corrected as shown below:

Column 2, line 24, "plane" should be --plan--, after "another" insert --embodiment--.

Signed and Sealed this

Thirteenth Day of October, 1992

Attest:

DOUGLAS B. COMER

*Attesting Officer*    Acting Commissioner of Patents and Trademarks